Oct. 29, 1929.   P. KLIEBER   1,733,968
BELT POWER TRANSMITTING MECHANISM
Filed April 18, 1928

Inventor
Paul Klieber
By
Attorney

Patented Oct. 29, 1929

1,733,968

UNITED STATES PATENT OFFICE

PAUL KLIEBER, OF INDIANAPOLIS, INDIANA

BELT POWER-TRANSMITTING MECHANISM

Application filed April 18, 1928. Serial No. 271,043.

In mechanism of the usual type for transmitting power through the medium of belts, it is necessary to have the belt of considerable length in order to maintain the necessary contact between the belts and the pulleys to insure sufficient "traction" or pull and particularly at high speeds. It is well known that at high speeds the centrifugal action tends to throw the belt from the surface of the pulley, or cause the belt to assume as nearly a circular form as permitted by the slack, thus throwing the belt off the surface of the pulleys and decreasing its efficiency as a power transmitting medium. This is particularly true in machines which carry electric motors as driving power on the same frame as the other mechanism because of the fact that in such machines the driving and driven shafts are so near together that a belt drive for high speed and high power purposes must be too short to be practical.

My said invention relates to an idler designed for use in conjunction with belts employed, for example, in such machines for transmitting the power from the motor or driving shaft to the driven shaft. It consists partly in mounting said idler on an arm pivoted on a center which is the center of the driving shaft (or driven shaft), and providing means for varying the pressure of said idler upon the belt to secure the contact between the belt and pulley desired for the purposes and maintain such contact at all speeds, thus insuring that there will be a constant tension upon the belt and pulleys so that the power from high speed motors can be readily transmitted through short belts provided with such idlers and the advantages of a belt drive obtained in such machines without impairing their efficiency, all as will be hereinafter more fully described and claimed.

Figure 1:
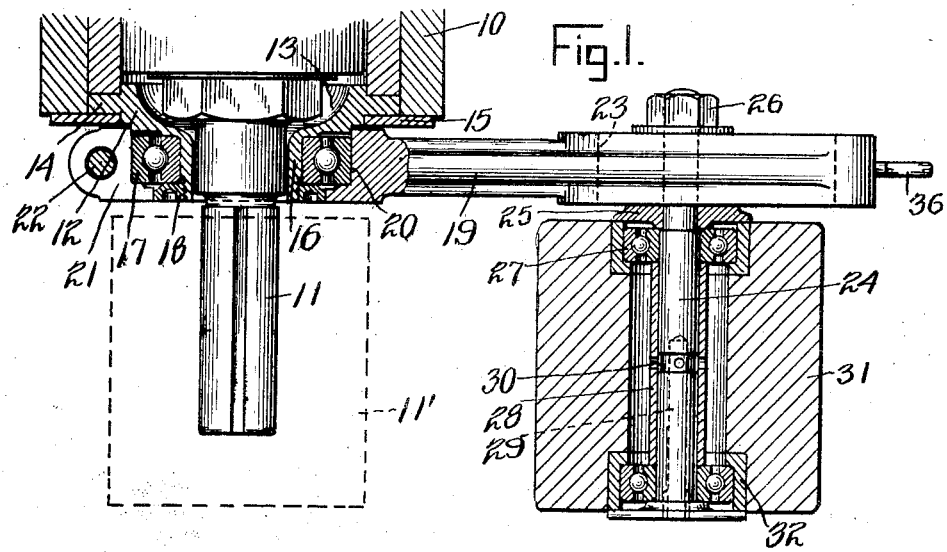
Figure 2:
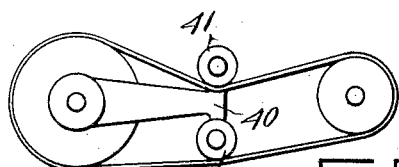
Figure 3:
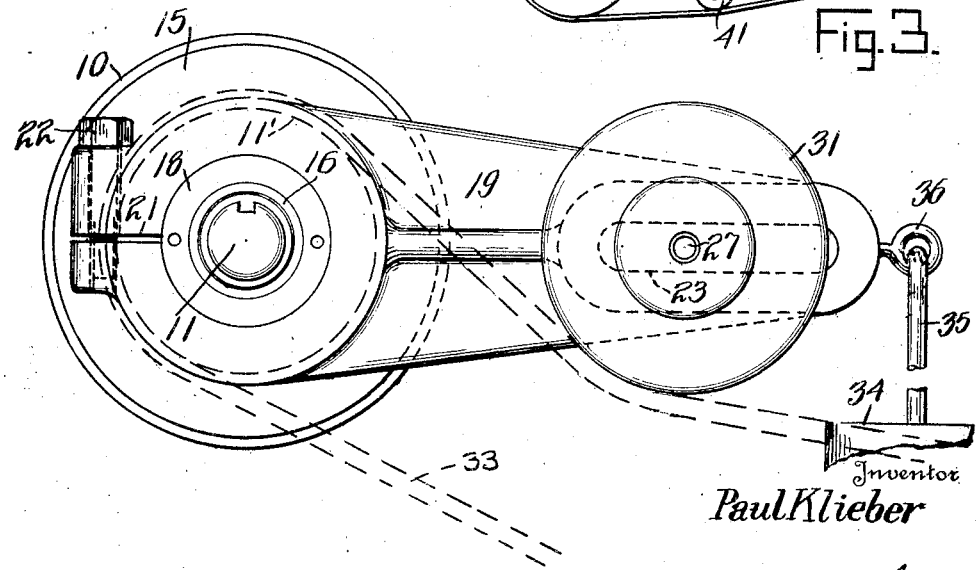

Referring to the accompanying drawings which are made a part hereof and on which similar reference characters indicate similar parts, Figure 1 is a horizontal section illustrating the application of my invention, Figure 2, an end elevation, and Figure 3, a modified construction.

In the drawings reference character 10 indicates a motor having a motor shaft provided with an extension 11 at one end for receiving a pulley 11'. The conventional cap of the motor casing is removed and a special cap 12 is substituted in its place on the shaft 11, said special cap being supported by the motor frame, a bracket or any other means being designed to support the shaft 11. The cap 12 has its inner side 13 hollowed out to accommodate the rotor of the motor and is provided with flange 14 which is held in position by a plate 15. The cap 12 has a reduced cylindrical extension 16 upon which is mounted a ball-bearing 17 held in place by means of the screw cap 18 on the extension 16.

An arm 19 has one end formed with a circular bearing which is mounted on portion 20. Said bearing is bifurcated at 21 and the parts are clamped together around the ball-bearing by means of a bolt or cap screw 22. By this construction the arm is freely rotatable upon the cap 12. The outer end of the arm is formed with an axially extending slot 23 in which is mounted an idler shaft 24 having a collar 25 thereon which serves in conjunction with a nut 26 to clamp the shaft to the arm. By this mounting the idler pulley may be adjusted longitudinally of the arm as desired.

The shaft 24 is provided with ball bearings 27 which are held in spaced relation by means of a sleeve 28. The outer end of the shaft 24 is provided with a longitudinal passage 29 which communicates with a central groove 30 through which lubricant may be forced for maintaining the ball-bearings properly lubricated. An idler pulley 31 is mounted upon the shaft 24, said idler pulley having metal sockets 32 for the reception of the ball-bearings 27. Means is provided for urging the pulley 31 against a belt 33 and such means in the present instance comprises a weight 34 connected by means of a link 35 with an eye screw 36 threaded into the end of the arm 19. It will be understood that a spring may be used instead of the weight, and that the arm may extend at any desired angle to adapt it for the particular use for which it is intended.

It will also be seen that like results may be obtained by mounting the idler supporting arm around the center of the driven instead of that of the driving shaft.

In Figure 3 I have shown a modified form, wherein the arm carrying the idlers is formed at its outer end with a cross-head 40, on each end of which is mounted an idler 41, each idler bearing upon the belt, one upon one side and the other upon the other side thereof. In some cases, such a construction may be desirable. It should be understood of course, that this cross-head may be carried in a slot similar to slot 23 in the principal construction, so that it may be adjusted if desired.

It will be seen that I have provided an idler which is of simple and inexpensive construction and which will not exert any appreciable resistance upon the belt with which it is in contact. Further the manner of its mounting is such that the oscillation of the pulley is readily permitted as well as the necessary adjustment for causing the pulley to exert the desired tension upon the belt and maintain the belt in proper contact with the pulleys.

It will be obvious to those skilled in the art that various changes may be made in my device without departing from the spirit of the invention, and I, therefore, do not limit myself to what is shown in the drawings and described in the specification, but only as set forth in the appended claims.

Having thus fully described my said invention, what I claim as new and desire to secure by Letters Patent, is:

1. The combination of a driven shaft, a pulley on said shaft adapted to rotate with the same, a support for said shaft having a reduced portion engaging the shaft and provided with an exterior runway, an anti-friction bearing on said runway, a screw cap holding the anti-friction bearing in position on the support, an arm clamped about said bearing, and an idler pulley adjustably mounted at the end of said arm, substantially as set forth.

2. The combination of a motor, a motor shaft, a replacement cap forming a bearing for the motor shaft and provided with an extension, a ball bearing on said extension, a screw cap holding the ball bearing in place, an arm having one end provided with a circular opening of a size to fit snugly over said bearing, said circular opening being provided with an inwardly extending flange adapted to overlap and conceal the bearing, and an idler pulley adjustably carried on the outer end of the arm, substantially as set forth.

3. The combination of a motor, a motor shaft, a replacement cap forming a bearing for the motor shaft and provided with an extension, a ball bearing on said extension, a screw cap holding the ball bearing in place, an arm having one end provided with a circular opening of a size to fit snugly over said bearing, said circular opening being provided with an inwardly extending flange adapted to overlap and conceal the bearing, and a pair of idler pulleys mounted on the outer end of said arm and arranged to engage opposite sides of a belt, substantially as set forth.

In witness whereof, I have hereunto set my hand at Indianapolis, Indiana, this 5th day of March, A. D. nineteen hundred and twenty-eight.

PAUL KLIEBER.